United States Patent
Xi et al.

(10) Patent No.: US 8,129,973 B2
(45) Date of Patent: *Mar. 6, 2012

(54) CONTROLLING A VOLTAGE REGULATOR

(75) Inventors: Xiaoyu Xi, Plano, TX (US); Shyam S. Somayajula, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 8 days.

This patent is subject to a terminal disclaimer.

(21) Appl. No.: 12/783,193

(22) Filed: May 19, 2010

(65) Prior Publication Data

US 2010/0227576 A1    Sep. 9, 2010

Related U.S. Application Data

(62) Division of application No. 11/241,334, filed on Sep. 30, 2005, now Pat. No. 7,737,673.

(51) Int. Cl.
*G05F 1/575* (2006.01)
*G05F 1/618* (2006.01)
(52) U.S. Cl. .................... 323/285; 323/284; 323/351
(58) Field of Classification Search .............. 323/222, 323/223, 224, 282, 284, 285, 351
See application file for complete search history.

(56) References Cited

U.S. PATENT DOCUMENTS

| | | | | |
|---|---|---|---|---|
| 5,568,044 A * | 10/1996 | Bittner | | 323/272 |
| 5,612,610 A * | 3/1997 | Borghi et al. | | 323/222 |
| 6,894,471 B2 * | 5/2005 | Corva et al. | | 323/282 |
| 7,098,632 B2 * | 8/2006 | Chen et al. | | 323/222 |
| 7,737,637 B2 * | 6/2010 | Koshihara et al. | | 313/512 |

* cited by examiner

*Primary Examiner* — Gary L Laxton
(74) *Attorney, Agent, or Firm* — Trop, Pruner & Hu, P.C.

(57) ABSTRACT

A wireless system includes a radio and a voltage regulator, which provides a supply voltage to the radio. The voltage regulator includes a storage element, at least one switch that is coupled to the storage element and a controller. The controller operates the voltage regulator in a continuous mode of operation, operates the voltage regulator in a discontinuous mode of operation in response to an output current of the voltage regulator decreasing below a predetermined threshold; operates the switch(es) to energize the storage element in response to a detection of whether an output voltage is below a threshold level; operates the switch(es) to halt the energization of the storage element in response to detecting a current in the storage element reaching a predetermined current threshold; operates the switch(es) to energize and de-energize the storage element in the discontinuous mode of operation; and operates the switch(es) to energize the storage element in synchronization with a periodic clock signal.

7 Claims, 6 Drawing Sheets

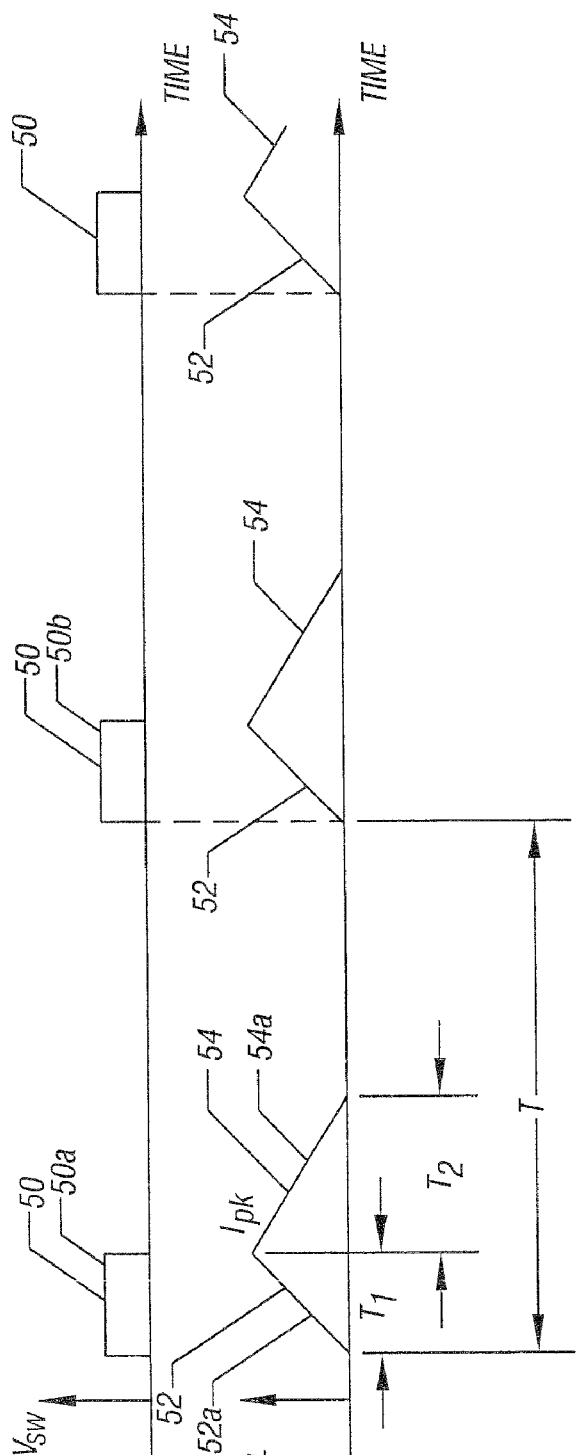

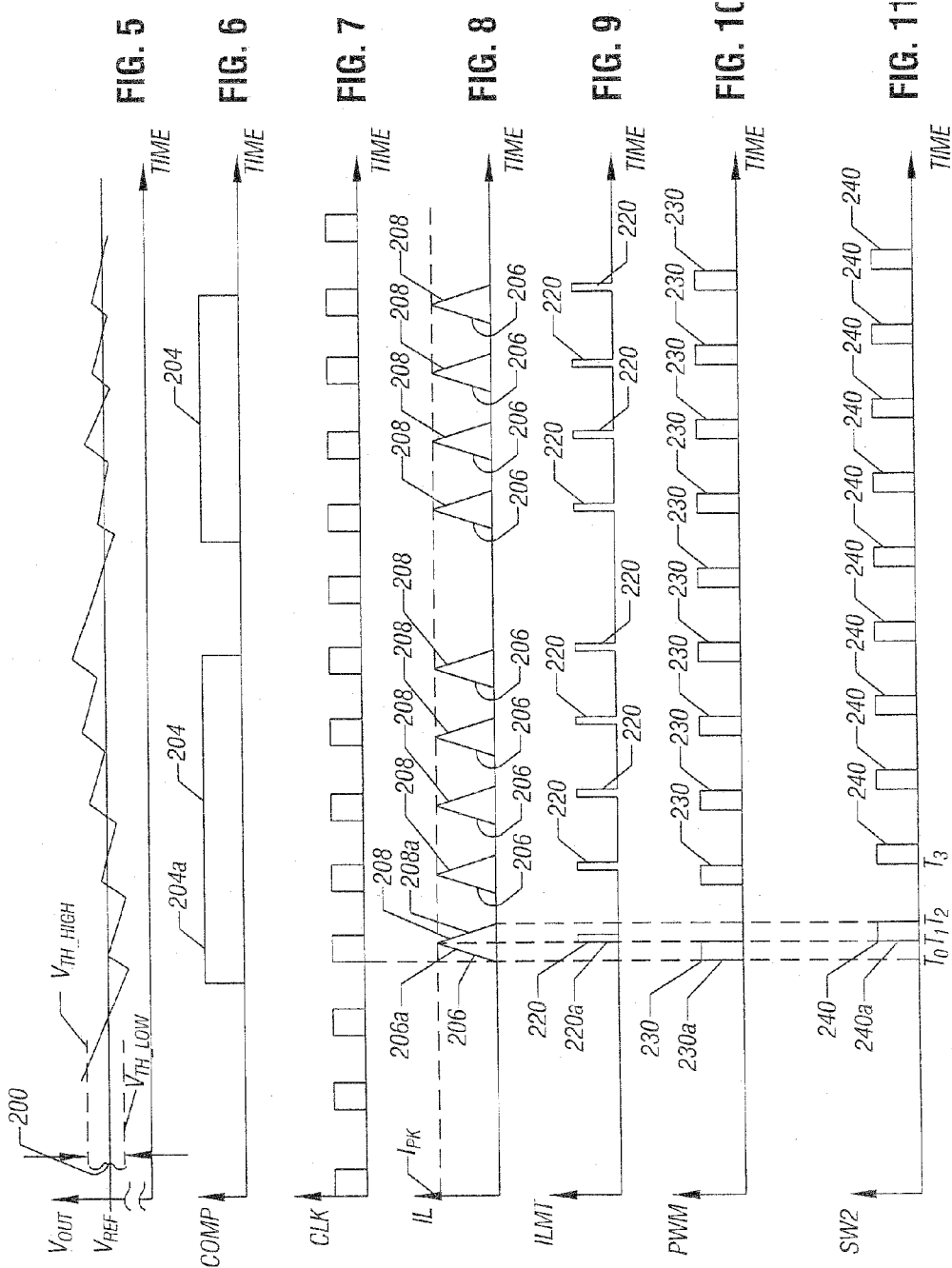

US 8,129,973 B2

CONTROLLING A VOLTAGE REGULATOR

This application is a divisional of U.S. patent application Ser. No. 11/241,334, entitled, "CONTROLLING A VOLTAGE OSCILLATOR, which was filed on Sep. 30, 2005 now U.S. Pat. No. 7,737,673 and is incorporated by reference in its entirety.

BACKGROUND

The invention generally relates to controlling a voltage regulator.

A voltage regulator typically is used for purposes of converting an input voltage of the regulator into a regulated output voltage. One type of voltage regulator is a linear regulator that uses a linear control element (such as a pass transistor) to absorb the voltage difference between the input and output voltages to regulate the output voltage. Another type of voltage regulator is a switching regulator that is often chosen due to its relatively compact size and higher efficiency. The switching regulator typically includes one or more switches (e.g., transistors) that are switched on and off at a switching frequency to communicate energy between input and output terminals of the regulator. The switching regulator controls the switching operation to regulate the output voltage.

SUMMARY

In an embodiment of the invention, a wireless system includes a radio and a voltage regulator, which provides a supply voltage to the radio. The voltage regulator includes a storage element, at least one switch that is coupled to the storage element and a controller. The controller operates the voltage regulator in a continuous mode of operation; operates the voltage regulator in a discontinuous mode of operation in response to an output current of the voltage regulator decreasing below a predetermined threshold; operates the switch(es) to energize the storage element in response to a detection of whether an output voltage is below a threshold level; operates the switch(es) to halt the energization of the storage element in response to detecting a current in the storage element reaching a predetermined current threshold; operates the switch(es) to energize and de-energize the storage element in the discontinuous mode of operation; and operates the switch(es) to energize the storage element in synchronization with a periodic clock signal.

Advantages and other features of the invention will become apparent from the following drawing, description and claims.

BRIEF DESCRIPTION OF THE DRAWING

FIGS. 2 and 3 are waveforms illustrating operation of the regulator core of FIG. 1.

FIGS. 5, 6, 7, 8, 9, 10 and 11 are waveforms illustrating operation of the switching regulator of FIG. 4 in a discontinuous mode of operation according to an embodiment of the invention.

DETAILED DESCRIPTION

Figure 1:
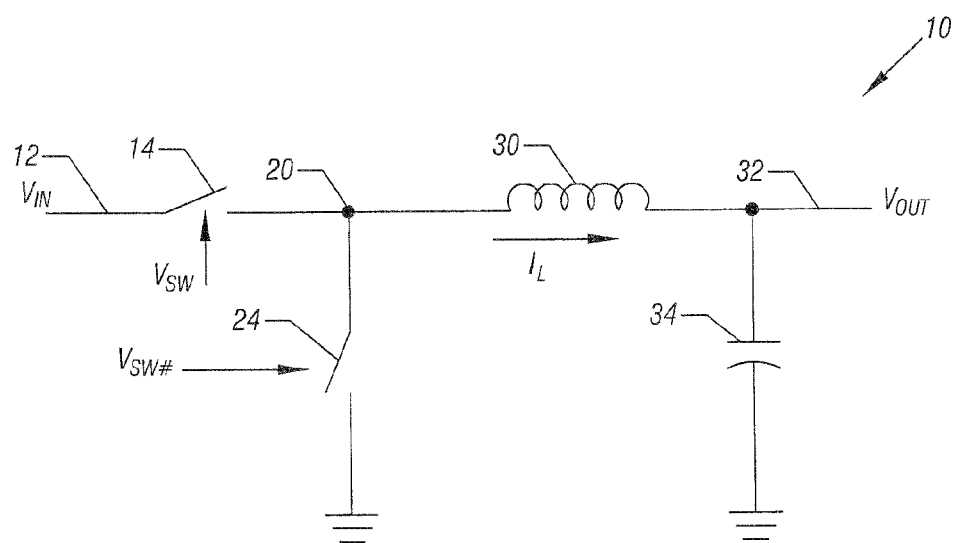
FIG. 1 is a schematic diagram of a DC-to-DC switching regulator core according to an embodiment of the invention.

Referring to FIG. 1, a DC-to-DC switching regulator core 10, in accordance with some embodiments of the invention, may be operated to produce a regulated output voltage (called "$V_{OUT}$," as depicted in FIG. 1) at its output terminal 32 in response to an input voltage (called "$V_{IN}$," as depicted in FIG. 1) that is received at an input terminal 12 of the core 10. The regulation of the $V_{OUT}$ voltage is achieved through controlling the switching operations of switches of the core 10: a switch 14 that is coupled between the input terminal 12 and a switching node 20; and a switch 24 that is coupled between the switching node 20 and ground. The switches 14 and 24 may be metal-oxide-semiconductor field effect transistors (MOSFETs), in some embodiments of the invention.

The $V_{OUT}$ voltage is regulated through the use of switching cycles. In an "on time" of a switching cycle, the regulator core 10 closes the switch 14 and opens the switch 24 to communicate energy from the input terminal 12 into an inductor 30 (a stand-alone inductor or a winding of a transformer, as examples), which is coupled between the switching node 20 and the output terminal 32. This communication of energy stores energy in the inductor 30 and causes a current (called "$I_L$" in FIG. 1) in the inductor 30 to ramp upwardly. In the "off time" of the switching cycle, the regulator 10 opens the switch 14 and closes the switch 24 to cause the $I_L$ current to ramp downwardly and de-energize the inductor 30. This action communicates energy from the inductor 30 to a load (not shown) that is coupled to the output terminal 32. A bulk, or filtering, capacitor 34 is coupled between the output terminal 32 and ground to filter out the AC component of the $I_L$ inductor current from DC output current that flows from the output terminal 32.

The regulator core 10 may operate in either a continuous mode of operation or a discontinuous mode of operation. In the continuous mode of operation, the $I_L$ inductor current (and thus, the DC output current of the core 10, which is the DC level of the $I_L$ inductor current) remains above zero during the off time interval of the switching cycle. For this mode of operation, the ratio of the $V_{OUT}$ to the $V_{IN}$ voltage is set by a duty cycle, which is a ratio of the on time of the switching cycle to the period of the switching cycle. In general, increasing the on time increases the $V_{OUT}$ voltage; and conversely, decreasing the on time (and thus, decreasing the duty cycle) decreases the $V_{OUT}$ voltage. Thus, the duty cycle may be controlled to precisely regulate the $V_{OUT}$ voltage, regardless of the variation in the $V_{IN}$ voltage within a certain range.

The discontinuous mode of operation is used when the DC $I_L$ inductor current (and thus, the core's DC output current) is sufficiently small enough so that the $I_L$ current does not remain above zero during the off time of the switching cycle (for practical inductor designs). The small DC $I_L$ inductor current may be present when a load to the core 10 is in a sleep, or power conservation mode; and when in this mode, the load draws relatively small output current from the core 10. Therefore, the regulator core 10 may be operated in the discontinuous mode when the load is in a sleep mode.

A control scheme called "burst mode control" may be used to control the switching operation of the regulator core 10 in the discontinuous mode of operation. Pursuant to burst mode control, the $V_{OUT}$ output voltage is monitored to detect when the $V_{OUT}$ voltage falls below a predetermined voltage threshold. Upon this occurrence, the inductor 30 is energized for a specific duration of time for purposes of communicating energy from the input terminal 12 to raise the $V_{OUT}$ output voltage. Pursuant to the burst mode control, in response to the $V_{OUT}$ voltage dropping below the predetermined threshold level, the switch 14 closes and the switch 24 opens for a constant duration to energize the inductor 30.

FIGS. 2 and 3 depict exemplary waveforms that further illustrate operation of the regulator core 10 pursuant to the burst mode control. FIG. 2 depicts a switch control voltage (called "$V_{SW1}$" in FIG. 2), a waveform that controls the switch 14. The switch 24 receives a signal (called "$V_{SW2}$"). The $V_{SW2}$ signal includes pulses 50 (specific pulses 50a and 50b being described below) that are generated in response to the $V_{OUT}$ voltage dropping below the predetermined voltage threshold level. Each pulse 50 produces a corresponding rise and fall of the $I_L$ inductor current, which is depicted in FIG. 3. More specifically, during the pulse 50, the switch 14 turns on and the switch 24 closes to cause the $I_L$ inductor current to ramp upwardly, as depicted by a positive slope 52. At the end of the pulse 50, the switch 14 opens and the switch 24 closes to cause the $I_L$ inductor current to ramp downwardly, as depicted by the negative slope 54, until the inductor 30 discharges and the $I_L$ inductor current reaches zero.

For the specific pulse 50a, the $I_L$ inductor current ramps upwardly pursuant to a positive slope 52a during the constant on time that is labeled "$T_1$," and after the pulse 50a, the $I_L$ inductor current subsequently ramps downwardly during the off time that is labeled "$T_2$" pursuant to the negative slope 54a. As shown in FIG. 3, the time between successive pulses, such as exemplary pulses 50a and 50b, which is the period of the switching cycle, is called "T."

A challenge with the above-described burst mode control is that the charge that is transferred from the input terminal 12 into the inductor 30 varies with the square of the $V_{IN}$ input voltage. Thus, if the $V_{IN}$ input voltage is provided by a battery, the regulator core 10 is designed to regulate an input voltage that falls within a relatively wide expected range of voltages; and thus, the charge varies with the square of this range. As an example, if the $V_{IN}$ input voltage drops by thirty percent, the charge that is transferred to the inductor 30 drops by fifty percent, which means that twice the number of switching cycles are used to supply the same load current. Therefore, because there is a switching dynamic loss that is associated with every switching activity, the efficiency of the above-described burst mode control depends heavily on the level of the $V_{IN}$ input voltage.

Therefore, in accordance with some embodiments of the invention, instead of making the on time of the switching cycle constant, the peak value of the $I_L$ current is regulated at a constant value when the regulator core 10 is operated in a discontinuous mode of operation. As described further below, this control scheme is more efficient, in that the charge that is transferred to the load is maximized by charging the $I_L$ inductor current to the same current limit level, regardless of the level of the $V_{IN}$ input voltage.

Figure 4:
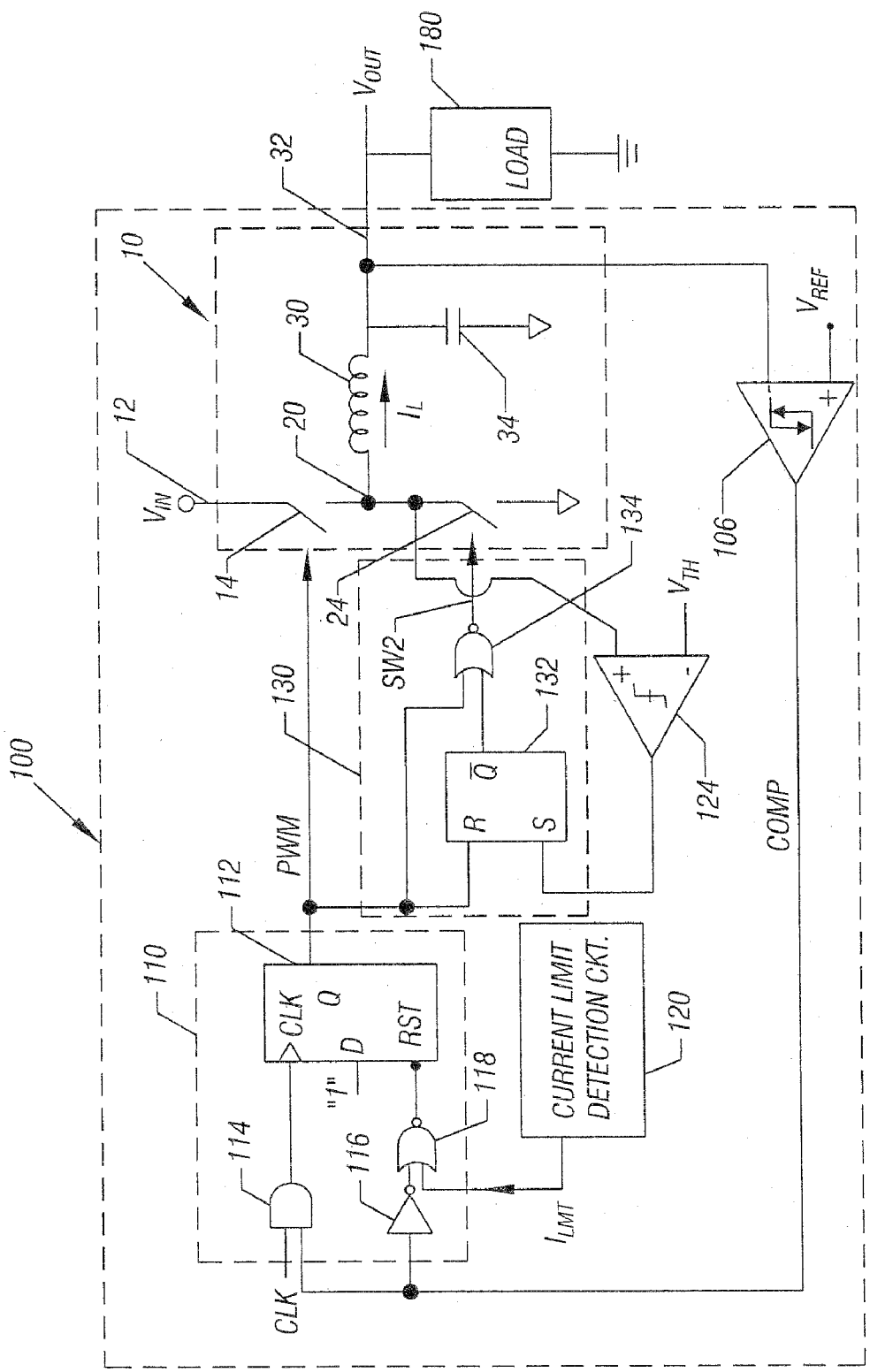
FIG. 4 is a schematic diagram of a DC-to-DC switching regulator that incorporates the switching regulator core of FIG. 1 according to an embodiment of the invention.

As a more specific example, FIG. 4 depicts an embodiment 100 of a DC-to-DC switching regulator, which provides power to a load 180. The regulator 100 includes the regulator core 10 of FIG. 1 in addition to control circuitry that implements a control scheme to control the $I_L$ inductor current in a manner that regulates the peak $I_L$ inductor current when the regulator 100 is operated in a discontinuous mode of operation (and thus, when the load 180 is in a power conservation, or sleep mode). It is noted that circuitry to control the regulator 10 during a non-sleep mode of the load 180 is not depicted in FIG. 4 for purposes of simplifying the following description. This other circuitry may, for example, control the regulator core 10 in a continuous conduction mode of operation during the non-sleep mode of the load 180 when the load 180 draws a sufficient DC current to maintain the $I_L$ inductor current above zero.

The switching regulator 100 includes a circuit 130 to provide a switching control signal (called "SW2," in FIG. 4) to control the switch 24 and a circuit 110 to provide a switching control signal (called "PWM," in FIG. 4) to control the switch 14. As described below, the circuits 100 and 130 establish switching cycles that 14 a period equal to the period of a clock signal called "CLK." When the $V_{OUT}$ output voltage decreases below the lower boundary of a regulated range, the circuits 110 and 130 control the switches 14 and 24 to pump energy to the output terminal 32 from the input terminal 12 to raise the $V_{OUT}$ output voltage. The switches 14 and 24 continue pumping energy until the $V_{OUT}$ output voltage meets or exceeds the upper boundary of the regulated range, and at this time, the pumping of energy from the input terminal 12 ceases until the $V_{OUT}$ output voltage decreases below the lower boundary of the regulated range.

More specifically, the switching regulator 100 includes a hysteresis comparator 106 to provide an indication (called a "COMP signal" in FIG. 4) to indicate whether the $V_{OUT}$ output voltage has decreased below a predetermined hysteresis threshold (called "$V_{TH\_LOW}$"), the lower boundary of the regulated range. Therefore, when the COMP signal indicates that the $V_{OUT}$ output voltage has dropped below the $V_{TH\_LOW}$ threshold, the circuit 110 asserts the PWM signal to close the switch 14, and the circuit 130 de-asserts the SW2 signal to open the switch 24 to energize the inductor 30. This causes the $I_L$ inductor current to ramp upwardly in a variable-duration on time of a switching cycle.

A current limit detection circuit 120 of the switching regulator 100 detects when the $I_L$ inductor current reaches a peak threshold, and in response to this occurrence, the current limit detection circuit 120 asserts a current limit detection signal (called "$I_{LMT}$" in FIG. 4) to cause the circuit 110 to de-assert the PWM signal to open the switch 14 and cause the circuitry 130 to assert the SW2 signal to close the switch 24. With the switch 14 opened and the switch 24 closed, the $I_L$ inductor current ramps downwardly to a predetermined value (such as zero, for example) in the off time of the switching cycle. The above-described switching cycles continue until the comparator 106 de-asserts the COMP signal to indicate that the $V_{OUT}$ output voltage has increased past an upper hysteresis threshold called "$V_{TH\_HIGH}$," the upper boundary of the regulated range.

As a more specific example, FIG. 5 depicts the $V_{OUT}$ output voltage (that is received at an inverting input terminal of the comparator 106) and a reference voltage (called "$V_{REF}$," as depicted in FIGS. 4 and 5) that is received at the non-inverting input terminal of the comparator 106. The comparator 106 detects when the $V_{OUT}$ voltage falls outside a hysteresis range 200 (i.e., the "regulated range") that is bounded by the upper $V_{TH\_HIGH}$ threshold and the lower $V_{TH\_LOW}$ threshold. Referring also to FIG. 6, when the $V_{OUT}$ output voltage drops below the $V_{TH\_LOW}$ threshold, the comparator 106 pulses the COMP signal high, as shown by the pulses 204 in the COMP signal in FIG. 6. In response to the $V_{OUT}$ output voltage increasing above the upper threshold $V_{TH\_HIGH}$, the comparator 106 de-asserts the COMP signal, as shown in FIG. 6 as the time between the pulses 204. Each pulse 204 of the COMP signal activates the switching regulator 100 for purposes of pumping more charge into the inductor 30 to raise the $V_{OUT}$ output voltage. Likewise, in the absence of a pulse 204 in the COMP signal, the switching regulator 100 is inactive, which allows the $V_{OUT}$ output voltage to fall due to the power that is consumed by the load 180 (see FIG. 4).

As a more specific example of the operation of the switching regulator 100 during the sleep mode of the load 180, referring to FIGS. 6, 7 and 8, after the assertion of an exemplary COMP pulse 204a (see FIG. 6) on a positive-going edge of the CLK signal (FIG. 7), the switch 14 closes and the switch 24 opens to cause the $I_L$ current (FIG. 8) to have a positive slope 206a. Referring also to FIG. 9, the $I_L$ inductor current eventually reaches an upper current limit (called "$I_{PK}$" in FIG. 8), an event that causes the current limit detection circuit 120 to generate a pulse 220 in the $I_{LMT}$ signal. Thus, FIG. 9 depicts the specific case in which the positive slope 206a produces the corresponding pulse 220a in the $I_{LMT}$ signal.

The circuits 110 and 130 respond to the $I_{LMT}$ pulse 220a to open the switch 14 and close the switch 24 to cause the $I_L$ inductor current to ramp downwardly in a corresponding negative slope 208a. Thus, in response to the $I_L$ inductor current reaching the $I_{PK}$ peak limit, the regulator 100 changes the states of the switches 14 and 24 to cause the $I_L$ inductor current to ramp downwardly.

The specific switch control signals PWM and SW2 are depicted in FIGS. 10 and 11. For purposes of closing the switch 14, the circuit 130 provides pulses 230, such as the specific pulse 230a that is depicted in FIG. 10. In the time between pulses 230, the switch 14 is open. FIG. 11 depicts pulses 240 in the SW2 signal, and specifically depicts the pulse 240a.

Referring to FIGS. 8-11, from the interval from $T_0$ to time $T_1$, the $I_L$ inductor current ramps upwardly until the current reaches the $I_{PK}$ level at time $T_1$; and from time $T_0$ to time $T_1$, the PWM signal is asserted and the SW2 signal is de-asserted to close the switch 14 and the open the switch 24. At time $T_1$, the switch 24 closes and the switch 14 opens, as indicated by the de-assertion of the PWM signal and the assertion of the SW2 signal to produce the pulse 240a. Thus, from time $T_1$ to time $T_2$, the $I_L$ inductor current ramps downwardly to a predetermined level (such as zero, for example).

Another switching cycle begins again at time $T_3$, as the COMP pulse 204a is still active. Thus, as long as a particular COMP pulse 204 is active, the switching regulator 100 continues the above-described control scheme in which the energy is communicated from the input terminal 12, and the $I_L$ inductor current is limited to a peak value.

Referring back to FIG. 4, in accordance with some embodiments of the invention, the circuit 110 that generates the PWM signal includes a D-type flip-flop 112. The non-inverting output terminal of the flip-flop 112 provides the PWM signal; a clock input terminal of the flip-flop 112 is connected to the output terminal of an AND gate 114; the signal input terminal of the flip-flop 112 receives a logic one signal; and the reset terminal of the flip-flop 112 is connected to output terminal of a NOR gate 118. One input terminal of the AND gate 114 receives the CLK clock signal, and another input terminal of the AND gate 114 receives the COMP signal. One input terminal of the NOR gate 118 receives an inverted COMP signal (provided by an inverter 116), and another input terminal of the NOR gate 118 receives the $I_{LMT}$ signal from the current limit detection circuit 120.

Thus, due to the above-described arrangement, the flip-flop 112 asserts the PWM signal in synchronization with a rising edge of the CLK clock signal if the COMP signal is asserted. The flip-flop 112 asynchronously (with respect to the CLK clock signal) de-asserts the PWM signal in response to the assertion of the $I_{LMT}$ signal.

The circuit 130 that generates the SW2 signal includes, in some embodiments of the invention, an RS flip-flop 132. The R input terminal of the flip-flop 132 receives the PWM signal, and the S input of the flip-flop 132 is connected to the output terminal of a comparator 124. The inverting output terminal of the flip-flop 132 is connected to one input terminal of a NOR gate 134, and another input terminal of the NOR gate 134 receives the PWM signal. The output terminal of the NOR gate 134 provides the SW2 switching signal. Additionally, the non-inverting input terminal of the comparator 124 is connected to the switching node 20, and the inverting input terminal of the comparator 124 receives a reference voltage (called "$V_{TH}$" in FIG. 4). In some embodiments of the invention, the $V_{TH}$ reference voltage may be zero, and thus, the inverting input terminal of the comparator 124 may be coupled to ground.

Due to the above-described arrangement, the de-assertion of the PWM signal causes the circuit 130 to assert the SW2 signal to turn on the switch 24. The circuit 130 keeps the SW2 signal asserted until current flow through the switch 24 reaches a predetermined level, which causes the voltage across the switch 24 (sensed by the comparator 124) to develop a voltage drop equal to the $V_{TH}$ reference voltage to cause the circuit 130 to de-assert the SW2 signal.

It is noted that the architecture that is depicted in FIG. 4 is one out of many possible architectures for the switching regulator 100 in accordance with some embodiments of the invention. Furthermore, although the switching regulator 100 is depicted using a Buck switching regulator topology, it is noted that other topologies (a boost topology, a flyback topology, etc.) may be used in other embodiments of the invention. Additionally, the switch 24 and circuit 130 may be replaced by a diode (a Schottky diode, for example), in other embodiments of the invention. For these embodiments of the invention, the anode of the diode is coupled to ground, and the cathode of the diode is coupled to the switching node 20.

Due to the above-described limiting of the peak inductor current, the charge (called "Q") that is transferred from the input terminal 12 to the inductor 30 may be described as follows:

$$Q = \frac{1}{2} I_{PK}^2 \frac{L}{V_{IN}} \frac{1}{(1-\alpha)\alpha}, \quad \text{Equation 1}$$

where "α" is a proportionality constant.

Thus, as compared to the burst mode control, the charge that is transferred to the output terminal 32 is inversely proportional to the $V_{IN}$ input voltage instead of being proportional to the square of the $V_{IN}$ input voltage. Therefore, the variation in charge transfer is significantly less with respect to changes in the $V_{IN}$ input voltage. Additionally, the charge that is transferred to the output terminal 32 is a maximum when the input voltage is a minimum, which is a favorable situation because efficiency may be more critical when the $V_{IN}$ input voltage is low. For a given $V_{IN}$ input voltage, the charge that is transferred to the output terminal 32 is maximized by charging the inductor current to the current limit level. Hence, less charge needs to be transferred in each switching cycle, as compared to the burst mode control, for example.

Figure 12:
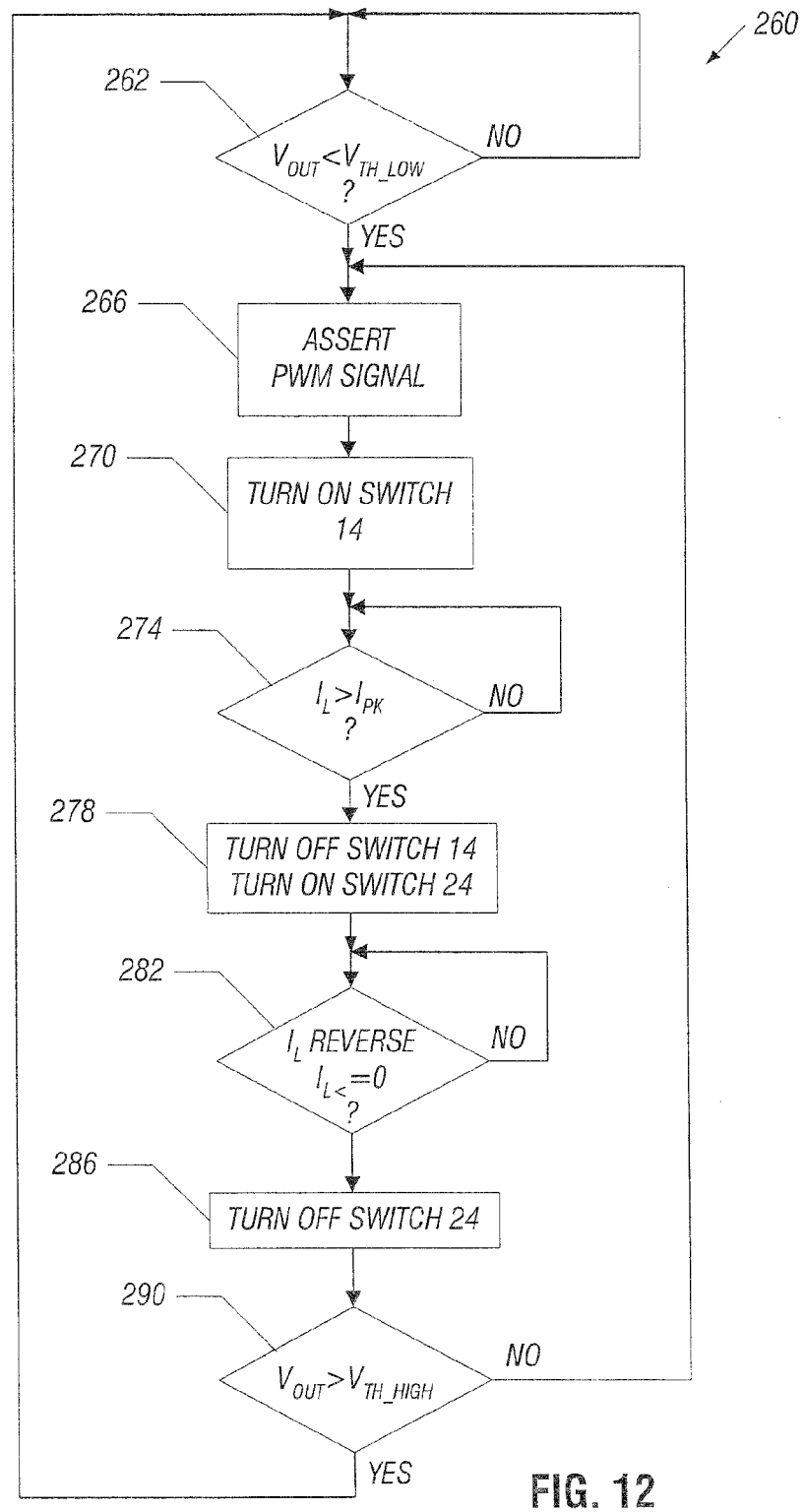
FIG. 12 is a flow diagram depicting a technique to regulate an output voltage of the switching regulator of FIG. 4 in a discontinuous mode of operation according to an embodiment of the invention.

FIG. 12 summarizes a control technique 260 to control a switching regulator in a discontinuous mode of operation in accordance with some embodiments of the invention. Pursuant to the technique 260, the $V_{OUT}$ output voltage is compared to the $V_{TH\_LOW}$ threshold to determine if the $V_{OUT}$ output voltage is less than this threshold. If not, then the comparison 262 continues. Otherwise, if the $V_{OUT}$ output voltage decreases below the $V_{TH\_LOW}$ threshold, the circuitry 110 asserts the PWM signal (depicted in block 266) to turns on the switch 14, as depicted in block 270. If a determination (diamond 274) is made that the $I_L$ inductor current is greater than the current limit threshold $I_{PK}$, then the switch 14 remains turned on, and the switch 24 remains open. Otherwise, if the current limit has been reached, then the switch 14 is turned off (i.e., opened) and the switch 24 is turned on (i.e., closed), as depicted in block 278.

The switching regulator 100 next determines, pursuant to the technique 260, whether the inductor current $I_L$ has decreased to a predetermined level (such as zero, for example), as depicted in diamond 282. Once this occurs, the switching regulator 100 turns off the switch 24, as depicted in block 286 and then determines (diamond 290) whether the $V_{OUT}$ output voltage has increased past the $V_{TH\_HIGH}$ threshold. If not, control returns to block 266 at the next clock edge to begin another switching cycle to further raise the $V_{OUT}$ output voltage. Otherwise, control returns to diamond 262 to wait for the $V_{OUT}$ output voltage to decrease below the regulated range.

Figure 13:
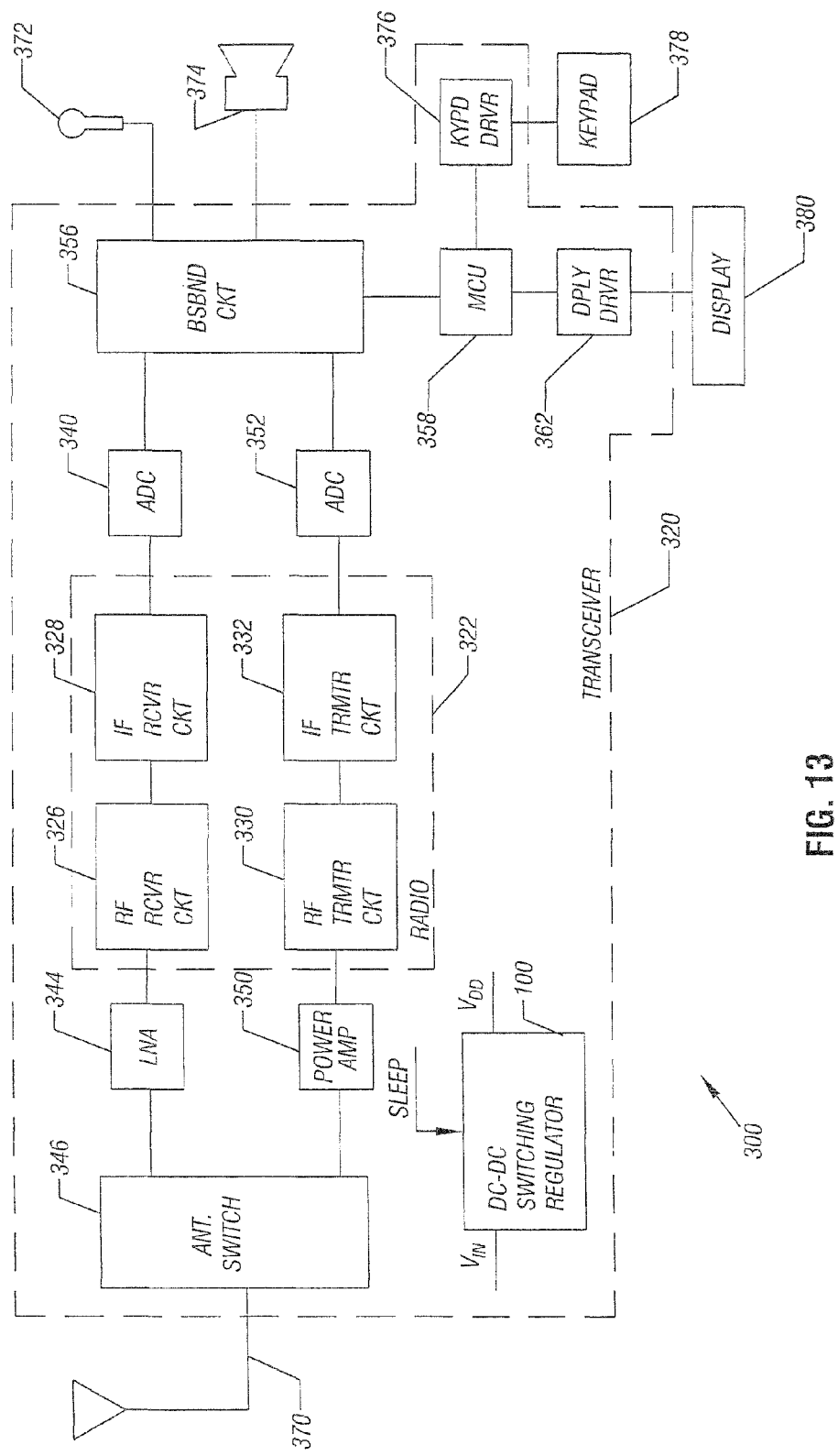
FIG. 13 is a schematic diagram of a wireless system that incorporates the switching regulator of FIG. 4 according to an embodiment of the invention.

Referring to FIG. 13, in accordance with some embodiments of the invention, the switching regulator 100 may be used in connection with a wireless system 300 (a cellular telephone, computer or personal digital assistant (PDA), as just a few examples). In particular, in accordance with some embodiments of the invention, the regulator 100 may provide one or more supply voltages for such components as one or more components of a radio 322 of the wireless system 300, as an example. Additionally, the regulator 10 may supply power to an analog-to-digital converter (ADC) 340 of the transceiver 320.

The switching regulator 100 may receive a signal (called "SLEEP" in FIG. 13) that is asserted (driven high, for example) to indicate a low power conservation state by the load to the regulator 100 and thus, cause the regulator 100 to use the control scheme that is depicted in FIG. 12 to control the regulator 100 in a discontinuous mode of operation. Alternatively, the regulator 100 may include a circuit to detect when its output current drops below a threshold current level and automatically switch the control scheme to the one that is depicted in FIG. 12 in response to this detection. Therefore, many variations are possible and are within the scope of the appended claims.

In general, the radio 322 may include a radio frequency (RF) receiver circuit 326 that receives an RF signal from a low noise amplifier (LNA) 344. The RF receiver circuit 326 may translate the RF signal to an intermediate frequency (IF) signal that is provided to an IF receiver circuit 328. In accordance with some embodiments of the invention, the IF receiver circuit 328 may provide a baseband signal that is converted into digital form by the ADC 340. As depicted in FIG. 13, the ADC 340 may be coupled to a baseband processing circuit 356.

The radio 322 may also include, for purposes of transmitting, an IF transmitter circuit 322 that receives an analog signal from a digital-to-analog converter (DAC) 352. The IF transmitter circuit 322 translates the analog signal, at a baseband frequency, into an RF signal that is processed by an RF transmitter circuit 330. The output signal from the RF transmitter circuit 330 may be provided to, for example, a power amplifier 350.

Among the other features of the wireless system 300, as depicted in FIG. 13, the LNA 344 and the power amplifier 350 may be coupled to an antenna switch 346 that, in turn, is coupled to an antenna 370 for the wireless system 300. The baseband circuitry 356 may receive an analog speech signal from a microphone 372 and may furnish, for example, an audio output signal to a speaker 374. Additionally, the transceiver 320 may include a microcontroller unit (MCU) 358 that is coupled to the baseband circuit 356 to control the general operation of the transceiver 320. The transceiver 320 may also include a keypad driver 376 and a display driver 362 that are coupled to the MCU 358. The display driver 362 drives a display 380; and the keypad driver 376 drives a keypad 378.

In some embodiments of the invention, the transceiver 320 may be formed on a single die in a single semiconductor package. However, in other embodiments of the invention, the transceiver 320 may be formed on multiple dies in a single semiconductor package. In yet other embodiments of the invention, the transceiver 320 may be formed in multiple semiconductor packages. Thus, many variations are possible and are within the scope of the appended claims.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A wireless system comprising:
   a radio; and
   a voltage regulator to provide a supply voltage to the radio, the voltage regulator comprising:
   a storage element;
   at least one switch coupled to the storage element; and
   a controller to:
      operate the voltage regulator in a continuous mode of operation,
      operate the voltage regulator in a discontinuous mode of operation in response to an output current of the voltage regulator decreasing below a predetermined threshold,
      operate said at least one switch to energize the storage element in response to a detection of whether an output voltage is below a threshold level, and
      operate said at least one switch to halt the energization of the storage element in response to detecting a current in the storage element reaching a predetermined current threshold, wherein
      the controller operates said at least one switch to energize and de-energize the storage element in the discontinuous mode of operation of the voltage regulator, and
      the controller operates said at least one switch to energize the storage element in synchronization with a periodic clock signal.

2. The wireless system of claim 1, wherein the controller is adapted to operate said at least one switch to de-energize the storage element after the energization of the storage element is halted.

3. The wireless system of claim 2, wherein the controller operates said at least one switch to energize and de-energize the storage element in response to the output voltage rising above another threshold.

4. The wireless system of claim 1, wherein the controller operates said at least one switch to de-energize the storage element in response to the current reaching a predetermined level.

5. The wireless system of claim 1, wherein the controller operates said at least one switch to energize and de-energize the storage element in a sleep mode of the radio.

6. The wireless system of claim 1, wherein the storage element comprises an inductor.

7. The wireless system of claim 1, wherein the energization and de-energization of the storage element occurs over successive switching cycles, and an average value of the output voltage monotonically rises during the successive switching cycles.

* * * * *